United States Patent
Li et al.

(10) Patent No.: US 12,171,225 B2
(45) Date of Patent: Dec. 24, 2024

(54) BIOCIDAL COMPOSITIONS WITH HYDRONIUM ION SOURCES FOR BIOFILM CONTROL

(71) Applicant: ECOLAB USA INC., Saint Paul, MN (US)

(72) Inventors: Junzhong Li, Saint Paul, MN (US); Joshua Luedtke, Saint Paul, MN (US); Jesse David Hines, Saint Paul, MN (US); John Paul Koehl, Saint Paul, MN (US); Richard Staub, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 19 days.

(21) Appl. No.: 17/303,409

(22) Filed: May 28, 2021

(65) Prior Publication Data
US 2021/0368787 A1  Dec. 2, 2021

Related U.S. Application Data

(60) Provisional application No. 62/704,813, filed on May 29, 2020.

(51) Int. Cl.
| | | |
|---|---|---|
| *A01N 31/02* | (2006.01) | |
| *A01N 25/30* | (2006.01) | |
| *A01N 41/04* | (2006.01) | |
| *A01N 41/10* | (2006.01) | |
| *A01N 59/00* | (2006.01) | |

(52) U.S. Cl.
CPC .......... *A01N 31/02* (2013.01); *A01N 25/30* (2013.01); *A01N 41/04* (2013.01); *A01N 41/10* (2013.01); *A01N 59/00* (2013.01)

(58) Field of Classification Search
CPC ........ A01N 31/02; A01N 25/30; A01N 41/04; A01N 41/10; A01N 59/00
See application file for complete search history.

(56) References Cited

U.S. PATENT DOCUMENTS

| | | | |
|---|---|---|---|
| 2,955,905 A | 10/1960 | Davies et al. | |
| 3,256,198 A | 6/1966 | Matzner | |
| 6,274,542 B1 | 8/2001 | Carr et al. | |
| 7,569,232 B2 * | 8/2009 | Man | A61L 2/183 424/455 |
| 7,887,641 B2 * | 2/2011 | Man | C11D 11/0041 134/28 |
| 8,114,222 B2 * | 2/2012 | Fernholz | C11D 3/3947 134/28 |
| 8,188,025 B2 | 5/2012 | Kany et al. | |
| 8,246,758 B2 * | 8/2012 | Man | A61L 2/186 134/28 |
| 8,398,781 B2 * | 3/2013 | Herdt | C11D 3/2075 134/28 |
| 8,871,807 B2 * | 10/2014 | Gohl | A23B 5/14 514/506 |
| 8,999,175 B2 * | 4/2015 | Man | A01N 37/16 210/764 |
| 9,462,806 B2 * | 10/2016 | Tiekemeier | A01N 37/16 |
| 9,540,598 B2 * | 1/2017 | Gohl | A23B 5/14 |
| 9,845,290 B2 | 12/2017 | Balasubramanian et al. | |
| 9,888,684 B2 | 2/2018 | Man et al. | |
| 10,023,484 B2 | 7/2018 | Keasler et al. | |
| 10,031,081 B2 * | 7/2018 | Li | G01N 21/6486 |
| 10,064,409 B2 | 9/2018 | Hazenkamp et al. | |
| 10,077,415 B2 * | 9/2018 | Gohl | C11D 11/0017 |
| 10,136,645 B2 | 11/2018 | Daigle | |
| 10,260,025 B2 | 4/2019 | Erickson et al. | |
| 10,278,392 B2 | 5/2019 | Bolduc et al. | |
| 10,368,555 B2 * | 8/2019 | Mullen | A23B 4/12 |
| 10,709,131 B2 | 7/2020 | Li et al. | |
| 11,026,421 B2 * | 6/2021 | Li | A01N 25/02 |
| 2005/0153031 A1 | 7/2005 | Man et al. | |
| 2005/0163896 A1 | 7/2005 | Man et al. | |
| 2014/0120179 A1 | 5/2014 | Smith et al. | |
| 2018/0110220 A1 | 4/2018 | Anderson et al. | |
| 2018/0168150 A1 | 6/2018 | Li et al. | |
| 2018/0216045 A1 | 8/2018 | Salminen et al. | |
| 2019/0090480 A1 | 3/2019 | Lo et al. | |
| 2019/0316065 A1 | 10/2019 | Salminen et al. | |

(Continued)

FOREIGN PATENT DOCUMENTS

| | | |
|---|---|---|
| CA | 2084172 A1 | 6/1993 |
| CA | 2152908 C | 7/1994 |
| JP | 2005146101 A | 6/2005 |

(Continued)

OTHER PUBLICATIONS

"Acids, Bases and pH: Preliminary Course," from Trinity College Dublin, The University of Dublin, downloaded May 4, 2024 from https://chemistry.tcd.ie/assets/pdf/Preliminary-Course/2017/Acids,%20bases%20and%20pH.pdf. Dated Sep. 14, 2017. (Year: 2017).*

Block, Seymour S., "Disinfection Sterilization and Preservation", 5th Edition, Lippincott Williams & Wilkins, 1481 pages, https://books.google.com/books?id=3f-kPJ17_TYC&printsec=frontcover#v=onepage&q&f=false, Jan. 2001.

Synergex—Material Safety Data Sheet, Ecolab Inc., 916834-03, 13 pages, May 13, 2019.

(Continued)

*Primary Examiner* — Michael P Cohen

(74) *Attorney, Agent, or Firm* — McKee, Voorhees & Sease, PLC

(57) ABSTRACT

Biocide compositions efficacious for biofilm control, including treatment and/or prevention, comprising the synergistic combination of biocide(s) with a source of hydronium ions are disclosed. Methods of deactivating, removing and/or preventing biofilms with the compositions are also provided.

20 Claims, No Drawings

(56) References Cited

U.S. PATENT DOCUMENTS

2021/0069653 A1    3/2021   Te Poele et al.

FOREIGN PATENT DOCUMENTS

| WO | WO-2012014016 A1 * | 2/2012 | ............ A61K 31/00 |
| WO | 2018085235 A1 | 5/2018 | |

OTHER PUBLICATIONS

International Searching Authority in connection with PCT/US2021/034711 filed May 28, 2021, "The International Search Report and the Written Opinion of the International Searching Authority, or the Declaration", 19 pages, mailed Nov. 30, 2021.

* cited by examiner

_US 12,171,225 B2_

BIOCIDAL COMPOSITIONS WITH HYDRONIUM ION SOURCES FOR BIOFILM CONTROL

CROSS-REFERENCE TO RELATED APPLICATIONS

This application claims priority under 35 U.S.C. § 119 to provisional application Ser. No. 62/704,813, filed May 29, 2020, herein incorporated by reference in its entirety.

FIELD OF THE INVENTION

The invention relates to the use of biocides for biofilm control, namely the synergistic combination of biocides with hydronium ions to treat and/or -deactivate biofilms. Compositions including a hydronium ion and one or more biocides are efficacious against biofilms. Methods of deactivating, removing and/or preventing biofilms with the compositions are also provided.

BACKGROUND OF THE INVENTION

Biofilms are biological conglomerates that contain pathogens, such as bacteria and other microorganisms, embedded in a matrix of exopolymers and macromolecules. In addition to bacteria, other microorganisms are commonly found in biofilm, including fungi, molds, algae, protozoa, archaea and mixtures of these microorganisms. Biofilms form as a result of microorganisms establishing on a surface and producing a protective extracellular polymeric matrix. Most often biofilm form on surfaces in contact with water, providing a hydrated matrix of polysaccharides to provide structural protection from biocides, making biofilm more difficult to kill than other pathogens. Biofilms are also often referred to as biomass accumulation, which are the buildup of microorganisms and/or extracellular substances including dirt and debris that become trapped in the biomass. Biofilm biomasses are highly resilient microbial assemblies of these biomass that are extremely difficult to eradicate and the bacteria living in a biofilm are considerably more resistant to host defenses and antibiotic or antimicrobial treatments. Some microorganisms attach to inert surfaces forming aggregates with a complex matrix consisting of extracellular polymeric substances (EPS). This consortium of attached microorganisms and the associated EPS is commonly referred to as a biofilm. Biocides have difficulty penetrating biofilms and removing them from surfaces.

Microbial infection and the formation of biofilm present significant complications in numerous industries. Although biofilm are known to exist in a wide variety of environmental conditions, since biofilm most often form on surfaces exposed to bacteria and water, industries such as food processing are commonly affected by biofilm. The presence of microorganisms in commercial and industrial waters are particularly challenging as they are difficult to completely eliminate, even with the excessive use of chemical biocides. The most common way to control biofouling is through the application of chemical biocides such as chlorine (e.g. hypochlorite) or other caustic compositions, bromine, isothiazolones, glutaraldehyde or other antimicrobials. The traditional metric for biocide efficacy in bulk solution systems is kill against microbes suspended in solution, so-called planktonic microbes. Removal of the planktonic microbes—or the inhibition of biofilm formation is a preferred method as it prevents bacterial adhesion on a surface (i.e. colonization). However, it is the microbes agglomerated on surfaces, biofilms, so-called sessile microbes, that significantly affect the process and operation of systems, including water systems.

Although biofilm are known to exist in a wide variety of environmental conditions, since biofilm most often form on surfaces exposed to bacteria and water, industries such as food processing are commonly affected by biofilm. For example, the organism _Listeria monocytogenes_ thrives in cool, damp environments, such as floor drains, plumbing and other surfaces of food processing facilities. This provides a potential point of contamination for a processing plant environment and food products produced therein. However, biofilm can also develop on inert surfaces of everyday household items. Exposure to such microorganisms through skin-surface contact may result in infections and compromise the public's health. Therefore, controlling the formation of biofilm is desirable to decrease exposure to infectious microorganisms.

Accordingly, it is an objective of the compositions described herein to provide synergistic efficacy in deactivating, removing and/or preventing biofilm, including biofilm on any surface, with a combination of hydronium ions and biocide(s).

It is a further objective to provide method of removing and/or preventing biofilm from a surface, including commercial and industrial water systems.

A further object is to provide compositions and methods effective in mitigating and/or eliminating biofilm from a surface.

Other objects, advantages and features of the present invention will become apparent from the following description taken in conjunction with the accompanying Examples.

SUMMARY OF THE INVENTION

An advantage of the invention is to provide synergistic efficacy able to deactivate biofilm and deactivate, reduce, or remove microbial populations from various surfaces through the combination of a source of hydronium ion and biocide(s). The compositions and methods with synergistic efficacy beneficially overcome the conventional limitations of requiring excessive dosing of biocides to provide control of biofilm and provide effective sanitizing of surfaces. Beneficially the combination can utilize various biocides which may be preferred depending upon the application of use and particular industry. Beneficially, the methods described herein provide treatment and deactivation of biofilm.

In an embodiment a biofilm deactivating composition comprises: at least one biocide, wherein the biocide is a peroxygen compound, fatty acid, anionic surfactant and/or quaternary ammonium compound; and a hydronium ion source, wherein the hydronium ion source is a strong acid comprising one or more of sulfuric acid, nitric acid, hydrochloric acid, phosphoric acid, hydrobromic acid, hydroiodic acid, or methane sulfonic acid, wherein a use solution of the composition at a concentration of at least about 100 ppm provides at least a 5-log reduction. In embodiments, the peroxygen compound biocide is a peroxycarboxylic acid, hydrogen peroxide, percarbonate salt, persulfate salt, perborate salt, permanganate salt, carbamide peroxide, and/or alkyl peroxide. In embodiments, the peroxycarboxylic acid is provided in a use solution of the composition at a concentration of at least about 100 ppm, at least about 150 ppm, or at least about 200 µm, or from about 100 ppm to about 500 ppm. In embodiments, the fatty acid is provided in a use solution of the composition at a concentration of at least about 100 ppm, or from about 100 ppm to about 500 ppm. In embodiments, the anionic surfactant is provided in a use solution of the composition at a concentration of at least about 1000 ppm, from about 1000 ppm to about 5000 ppm, or from about 1000 ppm to about 2000 ppm. In embodiments, the quaternary ammonium compound is provided in a use solution of the composition at a concentration of at least about 500 ppm, from about 500 ppm to about 5000 ppm, or from about 1000 ppm to about 2000 ppm. In embodiments, the hydronium ion source is provided in a use solution of the composition at a concentration of at least about 0.003 M hydronium ion, from about 0.003 M to about 0.1 M hydronium ion, or from about 0.005 M to about 0.1 M hydronium ion. In embodiments, at least one additional functional ingredient, such as a stabilizing agent is included.

In additional embodiments, a method of deactivating, reducing and/or removing adhered bacteria or biofilm from a surface comprises: contacting a microbial population with the compositions described herein; and reducing and/or eliminating the microbial populations. In embodiments, the microbial population is on a hard surface and/or within a water system. In embodiments, the surface is a food surface, and optionally wherein said food surface is poultry. In embodiments, the surface is in contact with a water system or water source, wherein the water system or water source is one or more of the following: oil field drilling fluids and muds; petroleum recovery processes; mining pipelines; pipelines containing water; fire water; industrial lubricants; cutting fluids; heat transfer systems; cooling towers; gas scrubber systems; latex systems; clay and pigment systems; cooling system; cooling towers; food, beverage and industrial process waters; pulp and paper mill systems; brewery pasteurizers; sweetwater systems; air washer systems; decorative fountains; water intake pipes; ballast water tanks; and ship reservoirs. In embodiments, the surface is a drain. In embodiments, the microbial population is a planktonic or sessile microbial population, or is a biofilm comprising one or more of bacterium comprising *Escherichia coli*, *Pseudomonas aeruginosa*, *Staphylococcal* bacteria, *Enterobacteriaceae* bacteria, and *Streptococcus* bacteria. According to any of the methods described herein, the composition can be provided as (a) a use or concentrated composition or (b) the at least one biocide and the hydronium ion source can be added to contact the microbial population separately, either sequentially or simultaneously.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

DETAILED DESCRIPTION OF THE PREFERRED EMBODIMENTS

The embodiments are not limited to particular biocidal compositions containing a source of hydronium ions and a biocide and/or methods of using the same to deactivate, remove, clean and/or prevent formation of the biofilm from a surface, which can vary and are understood by skilled artisans. It has been surprisingly found that combination of a source of hydronium ions and at least one biocide can synergistically deactivate the difficult to penetrate and treat biofilms, as well as prevent biofilm from growing in a water source and/or on a surface.

It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers within the defined range. Throughout this disclosure, various aspects are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments without undue experimentation, but the preferred materials and methods are described herein. In describing and claiming the embodiments, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

The term "biofilm," as used herein, means an extracellular matrix in which a population of microorganisms are dispersed and/or form colonies and/or are adhered to a surface. Biofilms are understood to be typically made of polysaccharides and other macromolecules, often referred to as exopolysaccharides, that are concentrated at an interface (usually solid/liquid) and act as a binding agent that surrounds such populations of microorganisms. Biofilms are further understood to include complex associations of cells, extracellular products and detritus (or non-living particulate organic material) that are trapped within the biofilm or released from cells within the biofilm. The term biofilm, as used herein, further refers to the ASTM definition of biofilm as an accumulation of bacterial cells immobilized on a substratum and embedded in an organic polymer matrix of microbial origin. Biofilms are understood to be a dynamic, self-organized accumulation of microorganisms and microbial and environmental by-products that is determined by the environment in which it lives. According to the invention, the phrases "biofilm remediation," "removing biofilm," "reducing biofilm" and like phrases, shall mean the use of the chemical biocide according to the invention which causes a reduction in the rate or extent of biofilm growth, removal of existing biofilm or portions of biofilm on surfaces and/or eradication of existing biofilm on a treated surface. According to the invention, the biocidal compositions disclosed herein physically remove and kill biofilm.

As used herein, the term "waters" includes cooling tower waters, food process or transport waters. Cooling tower waters include water being used in scrubbers, cooling towers and the like, including where water is performing the function of collecting impurities, capturing product and/or cooling the equipment. Food process or transport waters include produce transport waters (e.g., as found in flumes, pipe transports, cutters, slicers, blanchers, retort systems, washers, and the like), belt sprays for food transport lines, boot and hand-wash dip-pans, third-sink rinse waters, and the like. Waters also include domestic and recreational waters such as pools, spas, recreational flumes and water slides, fountains, and the like.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions may comprise, consist essentially of, or consist of the components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

The biocidal compositions according to the embodiments described herein present a significant improvement in the prior art and represent a significant change for industries in need of cleaning and sanitizing products for biofilm. The biocidal compositions efficacious against biofilm obviate the need for numerous biofilm-reducing agents that are individually and/or in combination unable to completely remove and/or kill biofilm. The biocidal compositions provide a superior biocidal product, resulting in improved kill rates of biofilm over known methods of chemical and biological removal or reduction. This is a beneficial result of the biocidal compositions have a "kill mechanism" capable of penetrating all layers of a biofilm composition and reaching the substrate surface. These and other benefits of the biofilm removal methods and biocidal compositions will be readily apparent based on the description contained here, providing improved compositions and methods for treating ubiquitous biofilm.

Various biofilm-reducing agents are known to provide some beneficial effects in biofilm reduction and/or prevention. For example, chelating agents such as EDTA and EGTA, chlorine, iodine and hydrogen peroxide have previously been used as biofilm-reducing agents. Chelating agents destabilize the outer cell membrane of the biofilm. Chlorine, iodine, and hydrogen peroxide remove biofilm by depolymerizing the matrix. Further, biofilm-reducing agents may include antimicrobial proteins, such as nisin, which may be produced by *Lactococcus lactus*. Biocides or antimicrobial agents are also used as biofilm-reducing agents however they have been ineffective at complete removal of biocides. However, as described herein, the biocidal compositions and methods described herein provide enhanced antimicrobial "-cidal" mechanisms that are superior to prior biofilm-reducing agents. According to a preferred embodiments, the biocidal composition and methods provide at least a 5-log order reduction or a 6-log order reduction in the population of microorganisms and pathogens in biofilm, compared to the optimal 3-log order reduction observed with use of conventional biofilm-reducing agents. Without being limited to particular mechanism of action, the beneficial results of the biocidal compositions according to the embodiments described herein result from the composition's penetration of all layers of a biofilm to the substrate surface, providing a complete kill of the microorganisms housed in such biofilm.

Biocidal Compositions

According to embodiments, the biocidal compositions include at least one biocide and a source of hydronium ions. The compositions can include additional functional ingredients and can be provided as concentrate or use compositions. According to further embodiments, the biocidal compositions include at least one biocidal peroxygen compound, biocidal fatty acid, biocidal anionic surfactant and/or biocidal quaternary ammonium compound and a source of hydronium ions from an acid. The compositions can include additional functional ingredients and can be provided as concentrate or use compositions. Exemplary biocidal compositions in a use solution are shown in Tables 1A-1D in the identified measurements (including ppm, moles, weight-%) and provide a use pH of about 2.5 or below.

TABLE 1A

| Material | First Exemplary Range | Second Exemplary Range | Third Exemplary Range |
| --- | --- | --- | --- |
| Biocidal Peroxygen compound | 10-500 ppm | 100-500 ppm | 100-250 ppm |
| Hydronium Ion | at least about 0.003M | 0.005-0.1M | 0.005-0.1M |
| Additional Functional Ingredients | 0-50 wt-% | 0-40 wt-% | 0-30 wt-% |
| Water | Remainder wt-% | Remainder wt-% | Remainder wt-% |

TABLE 1B

| Material | First Exemplary Range | Second Exemplary Range | Third Exemplary Range |
| --- | --- | --- | --- |
| Biocidal Fatty acid | 10-500 ppm | 100-500 ppm | 100-250 ppm |
| Hydronium Ion | at least about 0.003M | 0.003-0.1M | 0.005-0.1M |
| Additional Functional Ingredients | 0-50 wt-% | 0-40 wt-% | 0-30 wt-% |
| Water | Remainder wt-% | Remainder wt-% | Remainder wt-% |

TABLE 1C

| Material | First Exemplary Range | Second Exemplary Range | Third Exemplary Range |
| --- | --- | --- | --- |
| Biocidal Anionic Surfactant | 500-5000 ppm | 1000-5000 ppm | 1000-2000 ppm |
| Hydronium Ion | at least about 0.003M | 0.005-0.1M | 0.007-0.1M |
| Additional Functional Ingredients | 0-50 wt-% | 0-40 wt-% | 0-30 wt-% |
| Water | Remainder wt-% | Remainder wt-% | Remainder wt-% |

TABLE 1D

| Material | First Exemplary Range | Second Exemplary Range | Third Exemplary Range |
|---|---|---|---|
| Biocidal Quaternary Ammonium Compound | 500-5000 ppm | 1000-5000 ppm | 1000-2000 ppm |
| Hydronium Ion | at least about 0.003M | 0.005-0.1M | 0.005-0.1M |
| Additional Functional Ingredients | 0-50 wt-% | 0-40 wt-% | 0-30 wt-% |
| Water | Remainder wt-% | Remainder wt-% | Remainder wt-% |

Biocides
Peroxygen Biocide

A peroxygen biocide can include a peroxygen compound or peroxygen producing chemical and can also be employed as a biocide for the compositions described herein. Exemplary peroxygen compounds include compositions of matter that contains two or more oxygen atoms in the form of an oxygen-oxygen bond and that induce a higher oxidation state in another composition of matter, including but is not limited to: hydrogen peroxide, percarbonate salts, persulfate salts, perborate salts, permanganate salts, carbamide peroxide, and alkyl peroxides such as tert-butyl hydroperoxide and potassium monopersulfate, and any compound of the formula R—(COOOH)n in which R can be hydrogen, alkyl, alkenyl, alkyne, acylic, alicyclic group, aryl, heteroaryl, or heterocyclic group, and n is 1, 2, or 3, and named by prefixing the parent acid with peroxy, as well as those sulfonated carboxylic acid compositions described in as disclosed in U.S. Published Patent Applications 2010/0021557, 2010/0048730 and 2012/0052134. In a particular embodiment, the biocidal peroxygen compound are peroxycarboxylic acid compositions containing a peroxygen compound, such as hydrogen peroxide.

Peroxycarboxylic Acid Composition

A peroxycarboxylic acid or peroxycarboxylic acid composition can be employed as a biocide for the compositions described herein. Peroxycarboxylic (or percarboxylic) acids generally have the formula $R(CO_3H)n$, where, for example, R is an alkyl, arylalkyl, cycloalkyl, aromatic, or heterocyclic group, and n is one, two, or three, and named by prefixing the parent acid with peroxy. The R group can be saturated or unsaturated as well as substituted or unsubstituted. The compositions can include a mixture or combination of several different peroxycarboxylic acids including those of varying chain lengths, such as C1-C22. Such compositions are often referred to as mixed peroxycarboxylic acids or mixed peroxycarboxylic acid compositions. For example, in some embodiments, the composition includes one or more C1 to C4 peroxycarboxylic acids and one or more C5 to C22 peroxycarboxylic acids.

As referred to herein the methods of use and compositions can either include peroxycarboxylic acid (or peroxycarboxylic acid compositions comprising the peroxycarboxylic acid, carboxylic acid, hydrogen peroxide, water and optional additional components), or mixed peroxycarboxylic acids (or mixed peroxycarboxylic acid compositions comprising more than one peroxycarboxylic acid, more than one carboxylic acid, hydrogen peroxide, water and optional additional components). The peroxycarboxylic acid composition can be formed by combining one or more carboxylic acids and an oxidizing agent (e.g. hydrogen peroxide).

In a preferred embodiment the peroxycarboxylic acid composition comprises peroxyacetic acid and/or peroxyoctanoic acid.

In some embodiments, the peroxycarboxylic acid is included in the peroxycarboxylic acid forming composition or the biocidal composition at an amount of at least about 5 wt-% to about 50 wt-%, about 5 wt-% to about 40 wt-%, about 5 wt-% to about 20 wt-%, or about 5 wt-% to about 15 wt-%. In addition, without being limited according to the invention, all ranges recited are inclusive of the numbers defining the range and include each integer within the defined range.

In further embodiments the peroxycarboxylic acid is included in the biocidal composition, preferably a use solution thereof, at an amount of at least about 10 ppm, 20 ppm, 30 ppm, 40 ppm, 50 ppm, 60 ppm, 70 ppm, 80 ppm, 90 ppm, or 100 ppm. In further embodiments the peroxycarboxylic acid is included in the biocidal composition, preferably a use solution thereof, at an amount of at least about 100 ppm, at least about 150 ppm, or at least about 200 µm, or from about 100 ppm to about 500 ppm. In addition, without being limited according to the invention, all ranges recited are inclusive of the numbers defining the range and include each integer within the defined range. As one skilled in the art will recognize the concentration of the peroxycarboxylic acid can be provided at increased concentrations, however as a benefit to the synergistic efficacy of the biocidal compositions the efficacy is achieved without excessive dosing or concentrations of the peroxycarboxylic acid.

Carboxylic Acids

The peroxycarboxylic acid biocides can be provided as a peroxycarboxylic acid composition that includes a carboxylic acid, such as the compositions are formed by combining at least one carboxylic acid with an oxidizing agent. In some embodiments, at least two, at least three, or at least four or more carboxylic acids can be employed. The carboxylic acid for use with the compositions of the present invention is a C1 to C22 carboxylic acid. In some embodiments, the carboxylic acid for use with the compositions of the present invention is a C5 to C11 carboxylic acid. In some embodiments, the carboxylic acid is a C1 to C5 carboxylic acid. Examples of suitable carboxylic acids include, but are not limited to, formic, acetic, propionic, butanoic, pentanoic, hexanoic, heptanoic, octanoic, nonanoic, decanoic, undecanoic, dodecanoic, as well as their branched isomers, lactic, maleic, ascorbic, citric, hydroxyacetic, neopentanoic, neoheptanoic, neodecanoic, oxalic, malonic, succinic, glutaric, adipic, pimelic subric acid, and mixtures thereof. Preferred carboxylic acids include those that are organic compounds and/or approved as organic certified, such as acetic acid to produce peroxyacetic acid.

In some embodiments, the carboxylic acid is included in the peroxycarboxylic acid forming composition or the biocidal composition at an amount of at least about 5 wt-% to about 50 wt-%, about 15 wt-% to about 50 wt-%, about 15 wt-% to about 40 wt-%, or about 15 wt-% to about 30 wt-%. In addition, without being limited according to the invention, all ranges recited are inclusive of the numbers defining the range and include each integer within the defined range.

Oxidizing Agent

The peroxycarboxylic acid biocides can be provided as a peroxycarboxylic acid composition that includes an oxidizing agent, such as the peroxycarboxylic acids compositions are formed by combining at least one carboxylic acid with an oxidizing agent. Examples of inorganic oxidizing agents include the following types of compounds or sources of these compounds, or alkali metal salts including these types of compounds, or forming an adduct therewith: hydrogen peroxide, or hydrogen peroxide donors of: group 1 (IA) oxidizing agents, for example lithium peroxide, sodium peroxide; group 2 (IIA) oxidizing agents, for example magnesium peroxide, calcium peroxide, strontium peroxide, barium peroxide; group 12 (IIB) oxidizing agents, for example zinc peroxide; group 13 (IIIA) oxidizing agents, for example boron compounds, such as perborates, for example sodium perborate hexahydrate of the formula $Na_2 [B_2O_4(OH)_4]·6H_2O$ (also called sodium perborate tetrahydrate); sodium peroxyborate tetrahydrate of the formula $Na_2[(BO_2)_2 (OH)_4]·4H_2O$ (also called sodium perborate trihydrate); sodium peroxyborate of the formula $Na_2[(BO_2)_2(OH)_4]$ (also called sodium perborate monohy-drate); group 14 (IVA) oxidizing agents, for example persili-cates and peroxycarbonates, which are also called percarbon-ates, such as persilicates or peroxycarbonates of alkali metals; group 15 (VA) oxidizing agents, for example peroxynitrous acid and its salts; peroxyphosphoric acids and their salts, for example, perphosphates; group 16 (VIA) oxidizing agents, for example peroxysulfuric acids and their salts, such as per-oxymonosulfuric and peroxydisulfuric acids, and their salts, such as persulfates, for example, sodium persulfate; and group VIIa oxidizing agents such as sodium periodate, potas-sium perchlorate. Other active inorganic oxygen compounds can include transition metal peroxides; and other such peroxygen compounds, and mixtures thereof.

In some embodiments, the compositions and methods of the present invention employ one or more of the inorganic oxidizing agents listed above. Suitable inorganic oxidizing agents include ozone, hydrogen peroxide, hydrogen peroxide adduct, group IIIA oxidizing agent, or hydrogen peroxide donors of group VIA oxidizing agent, group VA oxidizing agent, group VIIA oxidizing agent, or mixtures thereof. Suitable examples of such inorganic oxidizing agents include percarbonate, perborate, persulfate, perphosphate, persilicate, or mixtures thereof.

Hydrogen peroxide presents one suitable example of an inorganic oxidizing agent. Hydrogen peroxide can be provided as a mixture of hydrogen peroxide and water, e.g., as liquid hydrogen peroxide in an aqueous solution. Hydrogen peroxide is commercially available at concentrations of 35%, 40-70%, and 90% in water. For safety, the 35-50% is commonly used.

Preferred oxidizing agents include those that are organic compounds and/or approved as organic certified, such as hydrogen peroxide.

In some embodiments, the oxidizing agent is included in the peroxycarboxylic acid forming composition or the biocidal composition at an amount of at least about 10 wt-% to about 70 wt-%, about 15 wt-% to about 70 wt-%, about 20 wt-% to about 70 wt-%, or about 25 wt-% to about 65 wt-%. In addition, without being limited according to the invention, all ranges recited are inclusive of the numbers defining the range and include each integer within the defined range.
Fatty Acid Biocide A fatty acid biocide can be employed as a biocide for the compositions described herein. Exemplary fatty acids include carboxylic acids having an aliphatic chain of at least 5 carbons, or between C5 to C22. Examples of suitable carboxylic acids include, but are not limited to, pentanoic, hexanoic, heptanoic, octanoic, nonanoic, decanoic, undecanoic, dodecanoic, as well as their branched isomers, lactic, maleic, ascorbic, citric, hydroxyacetic, neopentanoic, neoheptanoic, neodecanoic, oxalic, malonic, succinic, glutaric, adipic, pimelic subric acid, and mixtures thereof.

In embodiments the fatty acid is included in the biocidal composition, preferably a use solution thereof, at an amount of at least about 10 ppm, 20 ppm, 30 ppm, 40 ppm, 50 ppm, 60 ppm, 70 ppm, 80 ppm, 90 ppm, or 100 ppm. In further embodiments the fatty acid is included in the biocidal composition, preferably a use solution thereof, at an amount of at least about 100 ppm, at least about 150 ppm, or at least about 200 µm, or from about 100 ppm to about 500 ppm. In addition, without being limited according to the invention, all ranges recited are inclusive of the numbers defining the range and include each integer within the defined range. As one skilled in the art will recognize the concentration of the fatty acid can be provided at increased concentrations, however as a benefit to the synergistic efficacy of the biocidal compositions the efficacy is achieved without excessive dosing or concentrations of the fatty acid.
Anionic Surfactant Biocide An anionic surfactant biocide can be employed as a biocide for the compositions described herein. Anionic surfactants for use in the biocidal compositions must be compatible with hydronium ions and have biocidal efficacy under acidic pH conditions.

Suitable anionic surfactants include sulfonates and sulfates, including for example alkane sulfonates, alkyl aryl sulfonates, secondary alkane sulfonates, alkyl methyl ester sulfonates, alpha olefin sulfonates, alkyl ether sulfates, alkyl sulfates, linear and branched primary and secondary alkyl sulfates, alkyl ethoxy sulfates, fatty oleyl glycerol sulfates, alkyl phenol ethylene oxide ether sulfates, the C5-C17 acyl-N—(C1-C4 alkyl) and —N—(C1-C2 hydroxyalkyl) glucamine sulfates, and sulfates of alkylpolysaccharides such as the sulfates of alkylpolyglucoside, alcohol sulfates and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule). Anionic sulfonate surfactants suitable for use in the present compositions also include alkyl sulfonates, the linear and branched primary and secondary alkyl sulfonates, and the aromatic sulfonates with or without substituents. A few commercially available sulfate or sulfonated anionic surfactants include X-AES $(C_{12-14}$-$(PO)_{16}$-$(EO)_2$-sulfate available from Huntsman Chemical), SLS (sodium lauryl sulfate), SLES (sodium lauryl ether sulfate), LAS (linear alkyl benzyl sulfonate), and AOS (alpha olefin sulfonate).

Exemplary alkyl aryl sulfonates that can be used have an alkyl group that contains 6 to 24 carbon atoms and the aryl group can be at least one of benzene, toluene, and xylene. A suitable alkyl aryl sulfonate includes linear alkyl benzene sulfonate. A suitable linear alkyl benzene sulfonate includes linear dodecyl benzyl sulfonate that can be provided as an acid that is neutralized to form the sulfonate. Additional suitable alkyl aryl sulfonates include xylene sulfonate and cumene sulfonate. Suitable alkane sulfonates that can be used in the cleaning composition can have an alkane group having 6 to 24 carbon atoms. Suitable alkane sulfonates that can be used include secondary alkane sulfonates.

Suitable anionic surfactants further include carboxylic acids (and salts) and sulfonated carboxylic acids (and salts), such as alkanoic acids (and alkanoates), ester carboxylic acids (e.g. alkyl succinates) and sulfonated ester carboxylic acids, ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula: R—O—$(CH_2CH_2O)_n(CH_2)_m$—$CO_2X$ in which R is a C8-C22 alkyl group or

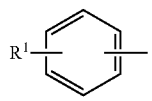

in which R1 is a C4-C16 alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a C8-C16 alkyl group. In some embodiments, R is a C12-C14 alkyl group, n is 4, and m is 1. Such alkyl and alkylaryl ethoxy carboxylates are commercially available. These ethoxy carboxylates are typically available as the acid forms, which can be readily converted to the anionic or salt form.

Further suitable anionic surfactants include alcohol ethoxylates, including alcohol ethoxylate carboxylates and alcohol ethoxylate phosphate esters. In an embodiment, the anionic surfactant is a weak acid anionic, such as a phosphate ester or alcohol ethoxylate phosphate ester.

In embodiments the anionic surfactant is included in the biocidal composition, preferably a use solution thereof, at an amount of at least about 100 ppm, 200 ppm, 300 ppm, 400 ppm, 500 ppm, 600 ppm, 700 ppm, 800 ppm, 900 ppm, or 1000 ppm. In further embodiments the anionic surfactant is included in the biocidal composition, preferably a use solution thereof, at an amount of at least about 1000 ppm, from about 1000 ppm to about 5000 ppm, or from about 1000 ppm to about 2000 ppm. In addition, without being limited according to the invention, all ranges recited are inclusive of the numbers defining the range and include each integer within the defined range. As one skilled in the art will recognize the concentration of the anionic surfactant can be provided at increased concentrations, however as a benefit to the synergistic efficacy of the biocidal compositions the efficacy is achieved without excessive dosing or concentrations of the fatty acid.

Quaternary Ammonium Compound Biocide

A quaternary ammonium compound biocide can be employed as a biocide for the compositions described herein. Accordingly, various quaternary ammonium compound with antimicrobial activity can be used in the compositions. The term "quaternary ammonium compound" or "quat" generally refers to any composition with the following formula:

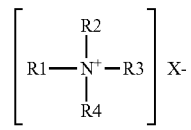

where R1-R4 are alkyl groups that may be alike or different, substituted or unsubstituted, saturated or unsaturated, branched or unbranched, and cyclic or acyclic and may contain ether, ester, or amide linkages; they may be aromatic or substituted aromatic groups. In an aspect, groups R1, R2, R3, and R4 each have less than a C20 chain length. X— is an anionic counterion. The term "anionic counterion" includes any ion that can form a salt with quaternary ammonium. Examples of suitable counterions include halides such as chlorides and bromides, propionates, methosulphates, saccharinates, ethosulphates, hydroxides, acetates, phosphates, carbonates (such as commercially available as Carboquat H, from Lonza), and nitrates. Preferably, the anionic counterion is chloride.

In some embodiments quaternary ammoniums having carbon chains of less than 20 or C2-C20 are included in compositions of the invention. In other embodiments quaternary ammoniums having carbon chains of C6-C18, C12-C18, C12-C16 and C6-C10 are included in compositions. Examples of quaternary ammonium compounds useful in the present invention include but are not limited to alkyl dimethyl benzyl ammonium chloride, alkyl dimethyl ethylbenzyl ammonium chloride, octyl decyl dimethyl ammonium chloride, dioctyl dimethyl ammonium chloride, and didecyl dimethyl ammonium chloride to name a few. A single quaternary ammonium or a combination of more than one quaternary ammonium may be included in compositions of the invention. Further examples of quaternary ammonium compounds include but are not limited to benzethonium chloride, ethyl benzethonium chloride, myristyl trimethyl ammonium chloride, methyl benzethonium chloride, cetalkonium chloride, cetrimonium bromide (CTAB), carnitine, dofanium chloride, tetraethyl ammonium bromide (TEAB), domiphen bromide, benzododecinium bromide, benzoxonium chloride, choline, cocamidopropyl betaine (CAPB), and denatonium.

In some embodiments quaternary ammoniums having carbon chains of less than 20 or C2-C20 are included in compositions of the invention. In other embodiments quaternary ammoniums having carbon chains of C6-C18, C12-C18, C12-C16 and C6-C10 are included in compositions of the invention.

In some embodiments depending on the nature of the R group, the anion, and the number of quaternary nitrogen atoms present, the antimicrobial quaternary ammonium compounds may be classified into one of the following categories: monoalkyltrimethyl ammonium salts; monoalkyldimethylbenzyl ammonium salts; dialkyldimethyl ammonium salts; heteroaromatic ammonium salts; polysubstituted quaternary ammonium salts; bis-quaternary ammonium salts; and polymeric quaternary ammonium salts. Each category will be discussed herein.

Monoalkyltrimethyl ammonium salts contain one R group that is a long-chain alkyl group, and the remaining R groups are short-chain alkyl groups, such as methyl or ethyl groups. Some non-limiting examples of monoalkyltrimethyl ammonium salts include cetyltrimethylammonium bromide, commercially available under the tradenames Rhodaquat M242C/29 and Dehyquart A; alkyltrimethyl ammonium chloride, commercially available as Arquad 16; alkylaryltrimethyl ammonium chloride; and cetyldimethyl ethylammonium bromide, commercially available as Ammonyx DME.

Monoalkyldimethylbenzyl ammonium salts contain one R group that is a long-chain alkyl group, a second R group that is a benzyl radical, and the two remaining R groups are short-chain alkyl groups, such as methyl or ethyl groups. Monoalkyldimethylbenzyl ammonium salts are generally compatible with nonionic surfactants, detergent builders, perfumes, and other ingredients. Some non-limiting examples of monoalkyldimethylbenzyl ammonium salts include alkyldimethylbenzyl ammonium chlorides, commercially available as Barquat from Lonza Inc.; and benzethonium chloride, commercially available as Lonzagard, from Lonza Inc. Additionally, the monoalkyldimethylbenzyl ammonium salts may be substituted. Non-limiting examples of such salts include dodecyldimethyl-3,4-dichlorobenzyl ammonium chloride. Finally, there are mixtures of alkyldimethylbenzyl and alkyldimethyl substituted benzyl (ethylbenzyl) ammonium chlorides commercially available as BTC 2125M from Stepan Company, and Barquat 4250 from Lonza Inc.

Dialkyldimethyl ammonium salts contain two R groups that are long-chain alkyl groups, and the remaining R groups are short-chain alkyl groups, such as methyl groups. Some non-limiting examples of dialkyldimethyl ammonium salts include didecyldimethyl ammonium halides, commercially available as Bardac 22 from Lonza Inc.; didecyl dimethyl ammonium chloride commercially available as Bardac 2250 from Lonza Inc.; dioctyl dimethyl ammonium chloride, commercially available as Bardac LF and Bardac LF-80 from Lonza Inc.); and octyl decyl dimethyl ammonium chloride sold as a mixture with didecyl and dioctyl dimethyl ammonium chlorides, commercially available as Bardac2050 and 2080 from Lonza Inc.

Heteroaromatic ammonium salts contain one R group that is a long-chain alkyl group, and the remaining R groups are provided by some aromatic system. Accordingly, the quaternary nitrogen to which the R groups are attached is part of an aromatic system such as pyridine, quinoline, or isoquinoline. Some non-limiting examples of heteroaromatic ammonium salts include cetylpyridinium halide, commercially available as Sumquat 6060/CPC from Zeeland Chemical Inc.; 1-[3-chloroalkyl]-3,5,7-triaza-1-azoniaadamantane, commercially available as Dowicil 200 from The Dow Chemical Company; and alkyl-isoquinolinium bromide.

Polysubstituted quaternary ammonium salts are a monoalkyltrimethyl ammonium salt, monoalkyldimethylbenzyl ammonium salt, dialkyldimethyl ammonium salt, or heteroaromatic ammonium salt wherein the anion portion of the molecule is a large, high-molecular weight (MW) organic ion. Some non-limiting examples of polysubstituted quaternary ammonium salts include alkyldimethyl benzyl ammonium saccharinate, and dimethylethylbenzyl ammonium cyclohexylsulfamate.

Bis-quaternary ammonium salts contain two symmetric quaternary ammonium moieties having the general formula:

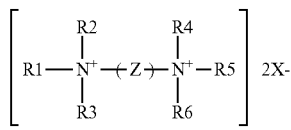

Where the R groups may be long or short chain alkyl, a benzyl radical or provided by an aromatic system. Z is a carbon-hydrogen chain attached to each quaternary nitrogen. Some non-limiting examples of bis-quaternary ammonium salts include 1,10-bis(2-methyl-4-aminoquinolinium chloride)-decane; and 1,6-bis[1-methyl-3-(2,2,6-trimethyl cyclohexyl)-propyldimethylammonium chloride] hexane or triclobisonium chloride.

In an aspect, the quaternary ammonium compound is a medium to long chain alkyl R group, such as from 8 carbons to about 20 carbons, from 8 carbons to about 18 carbons, from about 10 to about 18 carbons, and from about 12 to about 16 carbons, and providing a soluble and good antimicrobial agent.

In an aspect, the quaternary ammonium compound is a short di-alkyl chain quaternary ammonium compound having an R group, such as from 2 carbons to about 12 carbons, from 3 carbons to about 12 carbons, or from 6 carbons to about 12 carbons.

In an aspect, the quaternary ammonium compound is an alkyl benzyl ammonium chloride, a dialkyl benzyl ammonium chloride, a blend of alkyl benzyl ammonium chloride and dialkyl benzyl ammonium chloride, didecyl dimethyl ammonium chloride, dioctyl dimethyl ammonium chloride, a blend of didecyl dimethyl ammonium chloride and dioctyl dimethyl ammonium chloride, or mixtures thereof.

In embodiments the quaternary ammonium compound is included in the biocidal composition, preferably a use solution thereof, at an amount of at least about 100 ppm, 200 ppm, 300 ppm, 400 ppm, 500 ppm, 600 ppm, 700 ppm, 800 ppm, 900 ppm, or 1000 ppm. In further embodiments the quaternary ammonium compound is included in the biocidal composition, preferably a use solution thereof, at an amount of at least about 1000 ppm, from about 1000 ppm to about 5000 ppm, or from about 1000 ppm to about 2000 ppm. In addition, without being limited according to the invention, all ranges recited are inclusive of the numbers defining the range and include each integer within the defined range. As one skilled in the art will recognize the concentration of the quaternary ammonium compound can be provided at increased concentrations, however as a benefit to the synergistic efficacy of the biocidal compositions the efficacy is achieved without excessive dosing or concentrations of the fatty acid.

Hydronium Ion Source

A hydronium ion source is combined with the biocides described herein to provide synergistic biocidal efficacy against biofilms. Hydronium ion sources can include any compound that provides to the use solution a protonated water molecular ($H_3O^+$) as would occur with an aqueous acid. In an embodiment the hydronium ion source could be any compounds that can release/generate hydronium ion in aqueous solution. In an embodiment, the hydronium ion source is an acid, preferably a strong acid. Exemplary strong acids include sulfuric acid, hydrogen sulfate, phosphoric acid, nitric acid, hydrochloric acid, hydrobromic acid, hydroiodic acid, methane sulfonic acid or a combination thereof.

In embodiments the hydronium ion is included in the biocidal composition, preferably a use solution thereof, at an amount of at least about 0.003 moles (M) hydronium ion. In embodiments the hydronium ion is included in the biocidal composition use solution at an amount from about 0.003 to about 0.1 moles (M) hydronium ion.

In preferred embodiments, the hydronium ion is included in combination with a peroxygen compound in the biocidal composition use solution at an amount from about 0.003 to about 0.1 moles (M) hydronium ion, preferably about 0.005 M to about 0.1 M.

In preferred embodiments, the hydronium ion is included in combination with a fatty acid compound in the biocidal composition use solution at an amount from about 0.003 to about 0.1 moles (M) hydronium ion, preferably about 0.005 M to about 0.1 M.

In preferred embodiments, the hydronium ion is included in combination with an anionic surfactant compound in the biocidal composition use solution at an amount from about 0.005 to about 0.1 moles (M) hydronium ion, preferably about 0.007 M to about 0.1 M.

In preferred embodiments, the hydronium ion is included in combination with a quaternary ammonium compound in the biocidal composition use solution at an amount from about 0.003 to about 0.1 moles (M) hydronium ion, preferably about 0.005 M to about 0.1 M.

Water

In some embodiments, the biocidal compositions can include water. Water can be independently added to the composition or can be provided in the composition as a result of its presence in an aqueous material that is added to the composition.

In some embodiments, the composition includes sufficient water to make up the remainder of a composition, in other embodiments water is included in about 0 wt % to about 30 wt %, about 0.1 wt % to about 30 wt %, about 0.1 wt % to about 20 wt %, or about 0.5 wt % to about 15 wt %. It is to be understood that all values and ranges between these values and ranges are encompassed by the present invention.

Additional Functional Ingredients

The components of the biocidal compositions can further be combined with various functional components suitable for uses disclosed herein. In some embodiments, the compositions including the biocide and the hydronium ion source make up a large amount, or even substantially all of the total weight of the compositions. For example, in some embodiments few or no additional functional ingredients are disposed therein.

In other embodiments, additional functional ingredients may be included in the biocidal compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used.

In some embodiments, the compositions may include additional functional ingredients including, for example, additional surfactants, thickeners and/or viscosity modifiers, solvents, solubility modifiers, humectants, metal protecting agents, stabilizing agents, e.g., chelating agents or sequestrants or peracid stabilizers (e.g. DPA, HEDP, or other stabilizing agents such as those disclosed in U.S. Pat. No. 9,902,627, which is herein incorporated by reference in its entirety), corrosion inhibitors, sequestrants and/or chelating agents, solidifying agent, sheeting agents, pH modifying components, including alkalinity and/or acidity sources, aesthetic enhancing agents (i.e., colorants, odorants, or perfumes), other cleaning agents, hydrotropes or couplers, buffers, and the like. Additionally, the compositions can be used in conjunction with one or more conventional cleaning agents.

The additional functional ingredient(s) can be included in the biocidal compositions at an amount of at least about 0 wt-% to about 50 wt-%, about 0 wt-% to about 40 wt-%, about 0 wt-% to about 30 wt-%, or about 0 wt-% to about 20 wt-%. In addition, without being limited according to the invention, all ranges recited are inclusive of the numbers defining the range and include each integer within the defined range.

Methods of Use

Biocidal compositions efficacious for deactivating biofilm are provided and have many applications of use. The methods described herein should be understood to include treatment (i.e. deactivation), removal and prevention of biofilm formation and adhered microbial populations. It is far more commercially desired to deactivate/remove biofilm than to prevent, as the prophylaxis of biofilm formation requires ongoing (and in some instances continuous) dosing of the biocidal composition which can result in extremely high dosage of the chemistries. Beneficially, as the biocidal compositions and methods described herein provide efficacious treatment and removal, there is little need for commercial prevention. The methods employing the biocidal compositions are suitable for various applications in industrial or commercial water systems and/or water sources, in industrial and/or commercial applications as drain cleaners, hard surface cleaners and disinfectants, clean in place (CIP) sanitizers, and the like. For example, the compositions are suitable for system sanitation (e.g. tank/vessel/pipe sanitation). In further embodiments, the compositions are suitable for biofilm inactivation (i.e. deactivation), reduction and removal in water, paper, pulp processing and the like. In various other industrial and consumer applications the compositions are suitable for the biofilm inactivation, reduction and removal.

According to an embodiment, methods for deactivating, reducing and/or removing microbial populations in a water system or on a surface are provided. According to a further embodiment, methods for deactivating, reducing and/or removing biofilm from a water system or on a surface are provided. In some aspects, the methods are effective for killing one or more of the pathogenic bacteria associated biofilm production. Such bacteria include a wide variety of microorganisms, such as aerobic and anaerobic bacteria, including Gram positive and Gram-negative bacteria, yeast, molds, bacterial spores, viruses, etc. In further aspects, the methods are effective for removing slime in addition to microbial populations associated with biofilm.

An advantage of the invention is effective management or kill of both planktonic and sessile microorganisms through the use of the biocidal compositions described herein.

In an embodiment the methods are suitable for deactivating, reducing and/or removing microbial populations (namely biofilm) in a water system and/or source maintain water system operations and performance. Water systems and/or sources include, but are not limited to, cooling systems, including, but not limited to cooling towers, cooling basins, and reactor cooling systems; food, beverage and industrial process waters; pulp and paper mill systems; brewery pasteurizers; sweetwater systems; air washer systems; oil field drilling fluids and muds; petroleum recovery processes; mining pipelines; pipelines containing water; fire water; industrial lubricants; cutting fluids; heat transfer systems; cooling system; cooling towers; gas scrubber systems; latex systems; clay and pigment systems; decorative fountains; water intake pipes; ballast water tanks; and ship reservoirs.

In an embodiment the methods are also suitable for deactivating, reducing and/or removing microbial populations from various hard surfaces, including carcass tissue (or protein or meat), including for example poultry. In an exemplary embodiment, the biocidal compositions contact the surface, such as the poultry in any mode be that insures good contact between the carcass and the composition and optionally provides at least some minimal mechanical work to result in at least a one $\log_{10}$ reduction, preferably at least a two $\log_{10}$ reduction, more preferably a three $\log_{10}$ reduction, more preferably a four $\log_{10}$ reduction, and most preferably a five $\log_{10}$ reduction in the microbial populations in 30 seconds contact time for a sanitizing treatment. The methods are not limited by the range of carcass tissue, such as beef, pork, veal, buffalo, lamb, sea food, and poultry including but not limited to chicken, turkey, ostrich, game hen, squab or pheasant.

The methods may comprise, consist of and/or consist essentially of adding the biocidal composition (or the components making up the biocidal composition are added in one or more parts) to a water system or surface in need of microbial population or biofilm deactivation, reduction and/or removal. For clarity, the biocidal composition can be provided as (a) a use or concentrated composition or (b) the at least one biocide and the hydronium ion source can be added to contact the microbial population separately, either sequentially or simultaneously. The method of contacting and/or the order of adding components of the biocidal composition are not intended to limit the methods described herein.

In an aspect, the adding of the biocidal composition (or the components making up the biocidal composition) to the water source or surface soiled with a microbial population or biofilm (i.e. drain or pipe) reduces the colonization of target microorganisms, such as within a biofilm, by at least 20%, at least 40%, at least about 50%, at least about 60%, at least about 70%, at least about 80%, at least about 90%, or about 100%. In some embodiments, contacting the biocidal compositions to the microbial population or biofilm can completely remove the microbial population or biofilm (i.e., the composition is toxic to greater than 90%, or 99% or 99.9% of the bacterial cells of the biofilm). In an aspect, the reduction and/or removal of microorganisms within a biofilm is achieved within at least 1 day, at least 2 days, at least 3 days, at least 4 days, at least 5 days, at least 6 days, or at least 7 days. In an embodiment, the biocidal composition is dosed to a water source or surface soiled with a biofilm at least once per week to reduce and/or remove microorganisms within a biofilm. In certain embodiments, the target organisms comprise one or more of *Escherichia coli*, *Pseudomonas aeruginosa*, *Staphylococcal* bacteria, *Enterobacteriaceae* bacteria, and *Streptococcus* bacteria. In certain embodiments, the target organisms comprise *Pseudomonas aeruginosa*.

In an embodiment of the methods, the biocidal composition is introduced into a vessel or system/apparatus employed for water systems to sanitize the surface against unwanted bacterial agents. The introduction of the biocidal composition is employed for removing biofilm from a variety of hard surfaces, which may include clean-in-place systems (CIP) and/or clean-out-of-place systems (COP). For water system processes, COP systems may include for example readily accessible systems including tanks/vessels, removable system parts, and the like. For water system processes, CIP systems may include the internal components of tanks, lines, pumps and other process equipment used for processing typically liquid product streams. Beneficially, the treatment of the various CIP and/or COP portions of the system are uniquely suited to the water systems which rely heavily on internal recycling water. Such internal recycling is well suited to the methods employing biocidal compositions as these compositions that have sufficient longevity and compatibility with the water system source/materials.

In further embodiments of the methods, the biocidal composition is introduced to a water source, including water sources that are a byproduct of oil extraction applications. This water is reused, recycled or reinjected into disposal wells and the formation of bacteria into colonized biofilms in the presence of water is deleterious to such reuse, recycling and/or reinjection. Introduction of the biocidal composition beneficially disrupts and removes biofilms in the treated water source and surfaces in contact with the water source.

In a preferred aspect, the biocidal composition is introduced (e.g. injected) into a water system, such as through a pipe or vessel. In a further aspect, the biocidal composition is introduced upstream from a tank. Such introduction may further be in combination with traditional cleaning and sanitation practices that are routinely performed on the water system.

In some embodiments, the biocidal composition are drained from the moving water system. However, in other aspects, the biocidal composition (or a portion thereof) remains in the vessel or water system instead of being drained therefrom. A stagnant water system may take advantage of not requiring draining of the compositions. The amount of biocidal composition remaining in the vessel may vary according to the desired level of sanitization and dependent upon the stability of the biocidal composition.

In further embodiments of the methods, the biocidal composition is introduced to hard surface or a carcass surface, such as poultry, by submerging the surface into a housing containing the biocidal composition. Alternatively, the biocidal composition can be applied onto the surface, such as by spraying. In an embodiment, spraying can include a pressure spray of the biocidal composition onto the carcasses, the surface of the carcasses can optionally be moved with mechanical action, preferably agitated, rubbed, brushed, etc. Agitation may be by physical scrubbing of the carcasses, through the action of the spray solution under pressure or by other means. In some embodiments the agitation increases the efficacy of the spray solution in killing micro-organisms and/or reduces the contact time required. In some embodiments the spray solution, before application, may also be heated to a temperature of about 15 to 20° C., preferably about 20 to 50° C. to increase efficacy. After a sufficient amount of time to kill the micro-organisms on the carcasses, the spray solution may be rinsed off the animal carcasses. Additional disclosure of means of contacting the biocidal composition onto a carcass is disclosed for example, in U.S. Pat. No. 9,770,040, which is incorporated herein by reference in its entirety. In other embodiments no rinse is required.

It is to be understood that the methods employ an aqueous biocidal composition, which may be provided as a concentrate or a use solution. Such compositions can be applied to or brought into contact with an object by any conventional method or apparatus for applying an antimicrobial or cleaning compound to an object. For example, the object can be poured on, foamed on, and/or immersed in the compositions, or a use solution made from the compositions. The compositions can be sprayed onto a surface; the compositions can be caused to flow over the surface, or the surface can be dipped into the compositions. These and other methods of contacting an object or a surface with the biocidal composition are within the scope of the invention. Contacting can be manual or by machine.

The methods may include the introduction of the biocidal compositions at a temperature in the range of about 0° C. to 150° C., from about 4° C. to 150° C., or from about 4° C. to 60° C. depending upon the application of use. After introduction of the biocidal composition, the biocidal composition (e.g. solution) is held in the vessel and/or circulated throughout the system for a time sufficient for removal of the biofilm and/or sanitization (e.g., to kill undesirable microorganisms).

The contact time can vary based upon the concentration of the biocidal compositions, method of applying the compositions, temperature conditions, amount of soil, microorganisms or contamination on the surface or apparatus to be treated, or the like. In some aspects the biocidal compositions may be retained in the water system. In some aspects the exposure time can be at least about 60 seconds, or more. In some aspects, the contacting can be under conditions effective to treat the biofilm, for example for a time of 5 minutes to 5 hours, 10 minutes to 5 hours, 20 minutes to 5 hours, or 1 hour to 3 hours. As one skilled in the art will ascertain from the disclosure of the methods, the amount of contact time can vary based on factors including temperature, concentration of the biocidal composition, whether the treatment is stagnant or in a moving water system, and the like. After the biofilm and/or slime has been removed, the biocidal compositions may be removed (e.g. drained from the system) or retained (in whole or in part) in the system for additional cleaning and/or sanitizing benefit.

In some embodiments, the methods may further employ pressure and/or mechanical action with the application of the biocidal composition. As one of skill in the art will appreciate, mechanical action may include for example, agitation, rubbing, brushing, etc. Agitation can be by physical scrubbing of the surface (e.g. tank), through the action of the spray solution under pressure, through sonication, or by other methods. Agitation increases the efficacy of the spray solution in killing micro-organisms, perhaps due to better exposure of the solution into the crevasses or small colonies containing the micro-organisms. The spray solution, before application, can also be heated to increase efficacy.

As one of skill in the art will ascertain as being within the scope of the invention, the amount of biocidal composition provided to a water system will vary based upon a number of factors. For example, the size, structural orientation, materials employed therein, contamination level of the system, and the like will affect the amount (and/or concentration) of biocidal composition applied thereto. In some aspects, hundreds of gallons of biocidal composition (e.g. solution) may be provided to a water system. In other aspects, thousands of gallons of biocidal composition (e.g. solution) may be provided to a water system.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

The efficacy against biofilm was performed as described in the standard test methods ASTM E3161-18 (Standard Practice for Preparing a *Pseudomonas aeruginosa* or *Staphylococcus aureus* Biofilm using the CDC Biofilm Reactor) and ASTM E2871-19 (Standard Test Method for Determining Disinfectant Efficacy Against Biofilm Grown in the CDC Biofilm Reactor Using the Single Tube Method). A *Pseudomonas aeruginosa* (ATCC 15442) biofilm was the organism used for determination of composition efficacy against biofilm on hard non-porous surfaces. Biofilm for composition efficacy was generated as outlined in ASTM E3161-18. A 10 µL sample of a thawed frozen stock culture was used to inoculate 10 mL of sterile 100 mg/L Tryptic Soy Broth (TSB) which was then allowed to incubate for 24±2 hours at 35±2° C. Following growth, a 1 mL sample of this initial culture was used to inoculate a CDC Biofilm Reactor containing borosilicate glass coupons and 500 mL of sterile 300 mg/L TSB. The reactor system was allowed to incubate at room temperature (i.e. 21±2° C.) for 24±2 hours with a baffle rotational speed of 125±5 RPM under Batch Phase as directed in ASTM E3161-18. Following Batch Phase growth, Continuous Flow Phase growth was initiated by continuous pumping of 100 mg/L TSB into the reactor system at an appropriate flow rate to ensure the test organism residence time of 30±2 minutes. The reactor system was allowed to incubate at room temperature (i.e. 21±2° C.) for 24±2 hours with a baffle rotational speed of 125±5 RPM under Continuous Flow Phase as directed in ASTM E3161-18. Following completion of the growth, biofilm test carriers were removed from the CDC Biofilm Reactor, rinsed in sterile buffer to remove any non-adhered cells and individual carriers were placed into sterile 50 mL conical tubes for composition treatment. Determination of compositional efficacy against *Pseudomonas aeruginosa* biofilm was performed as outlined in ASTM E2871-19. A 4 mL sample of each composition (or sterile buffer for control carriers) was pipetted into each corresponding tube containing a test carrier. Triplicate test carriers were analyzed per composition or control. Test and control carriers were allowed to expose for 10 minutes at room temperature (i.e. 21±2° C.). Following exposure, each carrier was appropriately neutralized with 36 mL of Neutralizing Broth. Neutralized carriers were vortex mixed and sonicated to remove/disaggregate the biofilm from the carrier surface as outlined in ASTM E2871-19. Disaggregated biofilm samples were serially diluted in sterile buffer and spread plated onto appropriate agar for determination of plate counts. Log reductions for each composition were determined by comparing the calculated average $Log_{10}$ from the set of recovered control carriers to the calculated average $Log_{10}$ from each set of recovered composition carriers. In addition to carrier control determination, an appropriate Neutralization Confirmation Control was performed for each composition to ensure that the Neutralizing Broth chosen appropriately neutralized the test solution.

The various combinations of biocides and hydronium ion (all from sulfuric acid) were evaluated at the use concentration (ppm biocide) pH and moles of hydronium in the use concentration as set forth in Table 2. The average log reduction was measured for each tested combination (or Control with the biocide alone) and shown in Table 2.

TABLE 2

| Active Ingredient | Active Concentration (ppm) | pH | Hydronium Ion (M) | Average Log Reduction |
|---|---|---|---|---|
| Peroxyacetic acid (POAA) | 220 | 4.20 | 0.000063 [No hydronium ion source] | 2.15 |
| POAA | 220 | 3.46 | 0.00035 | 2.15 |
| POAA | 320 | 3.45 | 0.00035 | 2.41 |
| POAA | 420 | 3.46 | 0.00035 | 2.41 |
| POAA | 520 | 3.44 | 0.00035 | 2.41 |
| POAA | 220 | 2.98 | 0.001 | 2.15 |
| POAA | 220 | 2.50 | 0.0032 | 2.15 |
| POAA | 220 | 2.45 | 0.0035 | 2.11 |
| POAA | 220 | 2.30 | 0.0050 | 2.42 |
| POAA | 220 | 2.15 | 0.0071 | 3.85 |
| POAA | 220 | 2.00 | 0.01 | 4.45* |
| POAA | 220 | 2.29 | 0.0051 | 8.70 |
| POAA | 220 | 2.15 | 0.0071 | 6.50 |
| POAA | 110 | 2.29 | 0.0051 | 5.94 |
| Linear alkylbenzene sulfonate (LAS) | 1000 | 7.48 | 0.0000 | 2.07 |
| LAS | 2000 | 7.48 | 0.0000 | 2.41 |
| LAS | 3000 | 7.46 | 0.0000 | 2.41 |
| LAS | 4000 | 7.48 | 0.0000 | 2.41 |
| LAS | 1000 | 3.02 | 0.00095 | 2.19 |
| LAS | 1000 | 2.15 | 0.0071 | 5.74 |
| Peroxyoctanoic acid (POOA) | 100 | 5.45 | 0.0000 | 1.95 |
| POOA | 100 | 3.00 | 0.001 | 2.19 |
| POOA | 100 | 2.50 | 0.0032 | 7.24 |
| POOA | 100 | 2.15 | 0.0071 | 8.43 |
| Octanoic acid | 100 | 6.43 | 0.0000 | 2.07 |
| Octanoic acid | 200 | 6.43 | 0.0000 | 2.15 |
| Octanoic acid | 300 | 6.43 | 0.0000 | 2.15 |
| Octanoic acid | 400 | 6.43 | 0.0000 | 2.15 |
| Octanoic acid | 100 | 3.00 | 0.001 | 2.19 |
| Octanoic acid | 100 | 2.50 | 0.0032 | 7.59 |
| Octanoic acid | 100 | 2.15 | 0.0071 | 4.28 |
| Quaternary ammonium chloride (Barquat DM 50) | 1000 | 7.91 | 0.0000 | 1.95 |
| Quaternary ammonium chloride (Barquat DM 50) | 1500 | 7.92 | 0.0000 | 2.15 |
| Quaternary ammonium chloride (Barquat DM 50) | 2000 | 7.91 | 0.0000 | 2.15 |
| Quaternary ammonium chloride (Barquat DM 50) | 2500 | 7.90 | 0.0000 | 2.15 |
| Quaternary ammonium chloride (Barquat DM 50) | 1000 | 3.00 | 0.001 | 2.62 |
| Quaternary ammonium chloride (Barquat DM 50) | 1000 | 2.15 | 0.0071 | 6.97 |
| Quaternary ammonium chloride (Barquat DM 50) | 1000 | 2.30 | 0.0050 | 5.47 |

There was an outlier data point (*) where the micro efficacy should be significantly better at the pH. Repeat data demonstrates increase in log reduction.

The data in Table 2 show that neither the peracid nor the hydronium ion alone at the same concentration are efficacious in providing a log reduction of at least about 6 logs, instead the unique efficacy is obtained as a result of the synergy between the peracids and hydronium ions against biofilm. The data further shows that biocide in combination with hydronium ion are efficacious when using a fatty acid, anionic surfactant and/or quaternary ammonium-based biocide providing various benefits to formulate compositions with a variety of biocides that are compatible with the hydronium ions and provide the unexpected synergy against biofilms.

The data in Table 2 further shows that the synergy occurs when the hydronium ion from the acid source is combined with the biocide at an acidic pH to provide the synergy and efficacious log reduction, such as at least about 5 log reduction, or preferably at least about 6 log reduction. Although different regulatory agencies will require specific log reductions for micro efficacy, namely biofilm control and sanitizing efficacy, it is unexpectedly shown that there is a significant increase in micro efficacy when the combined biocide and hydronium ion source are combined. In some embodiments, at least a 5-log reduction, or preferably at least a 6-log reduction are achieved.

For example, the use of POAA without the hydronium ion fails to provide sufficient micro efficacy at the 220 ppm (this is a desirable concentration range as it is used for food contact). However, increasing the hydronium ion concentration and reducing the pH provides synergistic improvement in micro efficacy beyond any benefit that is achieved through the increase in the peroxycarboxylic acid concentration. There is no biocidal activity benefit obtained when increasing the peroxycarboxylic acid concentration above 220 ppm, including 320 ppm, 420 ppm and even 520 ppm. This same synergistic combination is shown with the increase of the concentration of the hydronium ion with the POOA and the quaternary ammonium chloride. This performance of micro efficacy is unexpected as you would expect to see the increase in biocide concentration result in the increase in micro efficacy, which is not the outcome as shown in Table 2.

The results in Table 2 further demonstrate that the pH (including as provided by the sulfuric acid) can be used to adjust the surface activity of the biocidal component. It is envisioned that additional acid sources could be employed to further increase or adjust the surface activity while providing the same ranges of biocidal compound and hydronium ion source.

Example 2

Testing of the biofilm deactivating compositions also shows further applications of use for treating adhered cells on a surface, including on a tissue surface (e.g. poultry). Beneficially, application of the composition directly to a surface in need of treatment provides at least 1-log reduction are achieved on the tissue surfaces, which is a commercially relevant biocidal efficacy. Beneficially, the biocidal compositions that provide synergistic increases in efficacy can be used for short contact times as are customary in poultry (and tissue or carcass) treatment and further do not result in any negative organoleptic effects. It is further desirable that the biocidal compositions can be provided as (a) a use or concentrated composition or (b) separately provided the components of the biocide and the hydronium ion source at a point of use, either sequentially or simultaneously.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. In addition, the contents of all patent publications discussed supra are incorporated in their entirety by this reference.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A biofilm deactivating composition comprising:
   at least one biocide, wherein the biocide comprises a peroxygen compound comprising peroxyacetic acid; and
   a hydronium ion source, wherein the hydronium ion source is an acid that provides to a use solution of the composition a protonated water molecule,
   wherein in the use solution, the biocide is at a concentration of about 100 ppm to about 500 ppm;
   wherein in the use solution the hydronium ion source has a concentration of about 0.0005 M to about 0.1 M hydronium ion;
   wherein the at least one biocide and the hydronium ion source interact to synergistically deactivate, reduce and/or eliminate adhered bacteria or biofilm, and
   wherein the use solution provides at least a 5-log reduction in the population of microorganisms and pathogens in the biofilm.

2. The composition of claim 1, wherein the peroxygen compound biocide further comprises an additional peroxycarboxylic acid, hydrogen peroxide, percarbonate salt, persulfate salt, perborate salt, permanganate salt, carbamide peroxide, and/or alkyl peroxide.

3. The composition of claim 2, wherein the additional peroxycarboxylic acid is a C1-C22 peroxycarboxylic acid or a C1-C22 peroxycarboxylic acid composition comprising hydrogen peroxide, C1-C22 carboxylic acid and the C1-C22 peroxycarboxylic acid.

4. The composition of claim 3, wherein the additional peroxycarboxylic acid is a peroxyoctanoic acid.

5. The composition of claim 1, wherein the peroxyacetic peroxycarboxylic acid is provided in a use solution of the composition at a concentration of about 100 ppm to about 250 ppm.

6. The composition of claim 1, wherein the at least one biocide further comprises a fatty acid, and wherein the fatty acid biocide is C5 to C22 carboxylic acid, and wherein the fatty acid is provided in a use solution of the composition at a concentration of about 100 ppm to about 250 ppm.

7. The composition of claim 1, wherein the at least one biocide further comprises an anionic surfactant, and wherein the anionic surfactant biocide is a sulfonate and/or sulfate, carboxylate and/or polycarboxylate, sulfonated ester carboxylic acids, ether carboxylic acids, sulfonated fatty acids, alcohol ethoxylates and/or combinations thereof.

8. The composition of claim 7, where the anionic surfactant is an alkane sulfonate.

9. The composition of claim 7, wherein the anionic surfactant is provided in a use solution of the composition at a concentration of about 1000 ppm to about 5000 ppm.

10. The composition of claim 1, wherein the biocide further comprises a quaternary ammonium compound, and wherein the quaternary ammonium compound biocide has the general formula

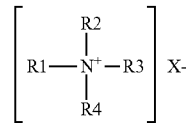

where R1-R4 each have less than a C20 chain length and are alkyl groups that may be alike or different, substituted or unsubstituted, saturated or unsaturated, branched or unbranched, and cyclic or acyclic and may contain ether, ester, or amide linkages, and may be aromatic or substituted aromatic groups, and wherein X— is an anionic counterion.

11. The composition of claim 10, wherein the quaternary ammonium compound is provided in a use solution of the composition at a concentration of about 1000 ppm to about 5000 ppm.

12. The composition of claim 1, wherein the hydronium ion source is provided in a use solution of the composition at a concentration of about 0.0007 M to about 0.1 M hydronium ion.

13. The composition of claim 1, further comprising a stabilizing agent.

14. A method of deactivating, reducing and/or removing adhered bacteria or biofilm from a surface comprising:
   contacting a microbial population with the composition according to claim 1; and
   deactivating, reducing and/or eliminating the microbial populations.

15. The method of claim 14, wherein the microbial population is on a hard surface and/or within a water system.

16. The method of claim 14, wherein said surface is a food surface, and optionally wherein said food surface is poultry.

17. The method of claim 14, wherein said surface is in contact with a water system or water source, wherein the water system or water source is one or more of the following: oil field drilling fluids and muds; petroleum recovery processes; mining pipelines; pipelines containing water; fire water; industrial lubricants; cutting fluids; heat transfer systems; cooling towers; gas scrubber systems; latex systems; clay and pigment systems; cooling system; cooling towers; food, beverage and industrial process waters; pulp and paper mill systems; brewery pasteurizers; sweetwater systems; air washer systems; decorative fountains; water intake pipes; ballast water tanks; and ship reservoirs.

18. The method of claim 14, wherein the surface is a drain.

19. The method of claim 14, wherein the microbial population is a planktonic or sessile microbial population, or is a biofilm comprising one or more of bacterium comprising *Escherichia coli*, *Pseudomonas aeruginosa*, *Staphylococcal* bacteria, *Enterobacteriaceae* bacteria, and *Streptococcus* bacteria.

20. The method of claim 14, wherein the composition can be provided as (a) a use or concentrated composition or (b) the at least one biocide and the hydronium ion source can be added to contact the microbial population separately, either sequentially or simultaneously.

* * * * *